US012755175B2

(12) United States Patent
Naveh et al.

(10) Patent No.: US 12,755,175 B2
(45) Date of Patent: Oct. 6, 2026

(54) GENERATING A GRAPHICAL REPRESENTATION OF A QUANTUM CIRCUIT

(71) Applicant: Classiq Technologies LTD., Tel Aviv (IL)

(72) Inventors: Amir Naveh, Haifa (IL); Shmuel Ur, Shorashim (IL); Lior Gazit, Tel Aviv (IL); Ofek Kirzner, Haifa (IL); Nir Minerbi, Haifa (IL)

(73) Assignee: CLASSIQ TECHNOLOGIES LTD., Tel Aviv (IL)

( * ) Notice: Subject to any disclaimer, the term of this patent is extended or adjusted under 35 U.S.C. 154(b) by 1051 days.

(21) Appl. No.: 17/810,661

(22) Filed: Jul. 5, 2022

(65) Prior Publication Data

US 2024/0013079 A1 Jan. 11, 2024

(51) Int. Cl.
*G06N 10/20* (2022.01)
*G06N 10/80* (2022.01)

(52) U.S. Cl.
CPC ............ *G06N 10/20* (2022.01); *G06N 10/80* (2022.01)

(58) Field of Classification Search
CPC ............ G06N 10/20
USPC ............ 706/1; 700/117
See application file for complete search history.

(56) References Cited

U.S. PATENT DOCUMENTS 11,281,988 B1 3/2022 Naveh
11,288,589 B1 3/2022 Naveh
11,294,797 B1 4/2022 Naveh
11,875,229 B2 * 1/2024 Naveh ............ G06N 10/40
2018/0159636 A1 * 6/2018 Gorshkov ............ H04B 10/70
2019/0080255 A1 * 3/2019 Allen ............ G06N 20/00
2019/0102496 A1 4/2019 Bishop et al.
2021/0126652 A1 * 4/2021 Delfosse ............ H03M 13/136
2021/0263643 A1 8/2021 Thom et al.
2021/0374594 A1 * 12/2021 Langer ............ G06F 8/41
(Continued)

FOREIGN PATENT DOCUMENTS

CN 110826720 A 2/2020
EP 3471028 A1 * 4/2019 ............ G06N 10/40
EP 4250187 A1 * 9/2023 ............ G06N 10/40
(Continued)

OTHER PUBLICATIONS

International Search Report from International Application No. PCT/IL2023/050557 dated Sep. 12, 2023, 10 pgs.
(Continued)

*Primary Examiner* — Van C Mang
(74) *Attorney, Agent, or Firm* — Tutunjian & Bitetto, P.C.

(57) ABSTRACT

A method, apparatus, and product includes obtaining a representation of a quantum circuit that is configured to manipulate a plurality of qubits over a plurality of cycles where the representation defines a first order of the plurality of qubits. A second order of the plurality of qubits is determined that is different from the first order of the plurality of qubits, wherein said determining the second order is based on an objective function that is configured to provide scores based on respective lengths of circuit components in graphical representations of the quantum circuit. A graphical representation of the quantum circuit is generated that displays the plurality of qubits in accordance with the second order, and the graphical representation is displayed.

19 Claims, 7 Drawing Sheets

(56) References Cited

U.S. PATENT DOCUMENTS

2023/0176557 A1* 6/2023 Cella .................... G05B 13/048
700/117

FOREIGN PATENT DOCUMENTS

WO WO-2022263790 A1 * 12/2022 .......... H03M 7/6064
WO WO-2023043996 A1 * 3/2023 ............. G06N 10/60

OTHER PUBLICATIONS

Jinfeng He et al., "Heuristic Reordering Strategy for Quantum Circuit Mapping on LNN Architectures", Computational Intelligence and Neuroscience, May 5, 2022, pp. 1-31, vol. 2022, Article ID 1765955.

* cited by examiner

GENERATING A GRAPHICAL REPRESENTATION OF A QUANTUM CIRCUIT

TECHNICAL FIELD

The present disclosure relates to quantum computing in general, and to generating a graphical representation of a quantum circuit, in particular.

BACKGROUND

Quantum computing is a computational paradigm that is fundamentally different from classic computing. In contrast to classic computing, which utilizes bits, quantum computing utilizes qubits. The qubits have unique features, as each qubit can be in superposition, several qubits can be entangled, and all operations on qubits besides measurement, referred to as quantum gates, must be reversible. The term quantum gate is analogous to classical logic gates. Temporarily computed values are stored on additional helper qubits, referred to as auxiliary qubits.

A quantum circuit may be represented by a graphical representation, such as a circuit diagram in which time flows, typically, from left to right. Typically, solid lines in circuit diagrams depict a qubit, or a qubit register. By convention, the top line is qubit register 00 and the remainder are labeled sequentially based on their name. Circuit diagram typically represent quantum gates as a box. Quantum gates may be ordered in chronological order with the left-most gates being applied first.

BRIEF SUMMARY

One exemplary embodiment of the disclosed subject matter is a method comprising: obtaining a representation of a quantum circuit, the quantum circuit is configured to manipulate a plurality of qubits over a plurality of cycles, the representation defining, explicitly or implicitly, a first order of the plurality of qubits; determining a second order of the plurality of qubits that is different from the first order of the plurality of qubits, wherein said determining the second order is based on an objective function, the objective function is configured to provide scores based on respective lengths of circuit components in graphical representations of the quantum circuit or portions thereof, wherein the objective function is configured to yield different scores for different orders of the plurality of qubits; generating a graphical representation of the quantum circuit or portion thereof, the graphical representation displaying the plurality of qubits in accordance with the second order of the plurality of qubits; and displaying the graphical representation of the quantum circuit or portion thereof.

Optionally, said determining the second order comprises solving an optimization problem with respect to the objective function.

Optionally, the graphical representation comprises a gate-level layer of the quantum circuit, wherein the circuit components comprise quantum gates, wherein the lengths of the quantum gates comprise, for each quantum gate, a distance between two farthest qubits that are manipulated by the quantum gate.

Optionally, the graphical representation comprises a functional-level layer of the quantum circuit, wherein the circuit components comprise functional blocks, wherein the lengths of the functional blocks comprise, for each functional block, a distance between two farthest qubits that are manipulated by the functional block.

Optionally, the graphical representation comprises two disjoint sections, wherein the objective function comprises a local objective function, wherein the local objective function is applied to at least one of the two disjoint sections, wherein the two disjoint sections comprise first and second sections, the method further comprising implementing a switching scheme between the first and second sections.

Optionally, the first section and the second section are determined so that there is no circuit component that is characterized in having a first portion thereof in the first section and a second portion thereof in the second section unless a relative order of qubits utilized by the circuit component is not affected by the switching scheme.

Optionally, the switching scheme comprises: utilizing the second order of the plurality of qubits for the first section, the second order is determined based on the local objective function and with respect to the first section; and utilizing a third order of the plurality of qubits for the second section, the third order is determined based on the local objective function and with respect to the second section.

Optionally, said utilizing the third order is based on a determination that a difference between a quality measurement of the second section when utilizing the third order, and between a quality measurement of the second section when utilizing the second order, is greater than a threshold, wherein a quality measurement of a section is determined based on the lengths of the circuit components within the section.

Optionally, the switching scheme comprises: utilizing the second order of the plurality of qubits for the first section, wherein the second order of the plurality of qubits is determined based on a global objective function that is applied with respect to all cycles of the graphical representation; and utilizing a third order of the plurality of qubits for the second section, wherein the third order is obtained based on the local objective function and with respect to the second section.

Optionally, the objective function comprises a global objective function, wherein the global objective function is applied to a layer of the graphical representation in its entirety.

Optionally, the first order of the plurality of qubits is obtained from a logical compiler that outputted, as part of a compilation process, the representation of the quantum circuit.

Optionally, the first order is implicitly defined by a naming of the plurality of qubits provided in the representation of the quantum circuit.

Optionally, said displaying the graphical representation of the quantum circuit comprises displaying a functional-level layer in accordance with the second order; and the method further comprises: in response to a user selection of a functional element displayed in the functional-level layer, displaying a gate-level layer of the functional element, wherein the gate-level layer of the functional element is displayed using a third order of the plurality of qubits or portion thereof, the third order is inconsistent with the second order.

Another exemplary embodiment of the disclosed subject matter is an apparatus comprising a processor and coupled memory, said processor being adapted to: obtain a representation of a quantum circuit, the quantum circuit is configured to manipulate a plurality of qubits over a plurality of cycles, the representation defining, explicitly or implicitly, a first order of the plurality of qubits; determine a second order of the plurality of qubits that is different from the first order of the plurality of qubits, wherein said determine the second order is based on an objective function, the objective function is configured to provide scores based on respective lengths of circuit components in graphical representations of the quantum circuit or portions thereof, wherein the objective function is configured to yield different scores for different orders of the plurality of qubits; generate a graphical representation of the quantum circuit or portion thereof, the graphical representation displaying the plurality of qubits in accordance with the second order of the plurality of qubits; and display the graphical representation of the quantum circuit or portion thereof.

Yet another exemplary embodiment of the disclosed subject matter is a computer program product comprising a non-transitory computer readable medium retaining program instructions, which program instructions, when read by a processor, cause the processor to: obtain a representation of a quantum circuit, the quantum circuit is configured to manipulate a plurality of qubits over a plurality of cycles, the representation defining, explicitly or implicitly, a first order of the plurality of qubits; determine a second order of the plurality of qubits that is different from the first order of the plurality of qubits, wherein said determine the second order is based on an objective function, the objective function is configured to provide scores based on respective lengths of circuit components in graphical representations of the quantum circuit or portions thereof, wherein the objective function is configured to yield different scores for different orders of the plurality of qubits; generate a graphical representation of the quantum circuit or portion thereof, the graphical representation displaying the plurality of qubits in accordance with the second order of the plurality of qubits; and display the graphical representation of the quantum circuit or portion thereof.

Yet another exemplary embodiment of the disclosed subject matter is a system comprising a processor and coupled memory, said processor being adapted to: obtain a representation of a quantum circuit, the quantum circuit is configured to manipulate a plurality of qubits over a plurality of cycles, the representation defining, explicitly or implicitly, a first order of the plurality of qubits; determine a second order of the plurality of qubits that is different from the first order of the plurality of qubits, wherein said determine the second order is based on an objective function, the objective function is configured to provide scores based on respective lengths of circuit components in graphical representations of the quantum circuit or portions thereof, wherein the objective function is configured to yield different scores for different orders of the plurality of qubits; generate a graphical representation of the quantum circuit or portion thereof, the graphical representation displaying the plurality of qubits in accordance with the second order of the plurality of qubits; and display the graphical representation of the quantum circuit or portion thereof.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
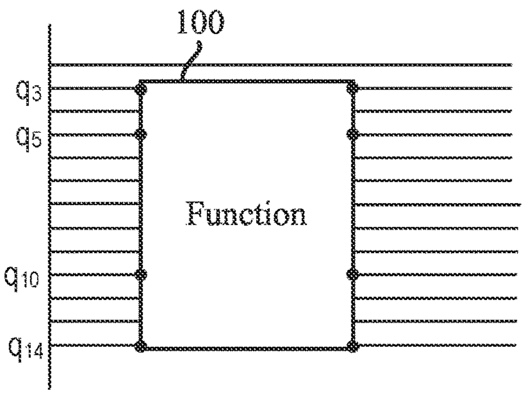
FIGS. 1A-1C illustrate exemplary graphical representations of a quantum circuit, in accordance with some exemplary embodiments of the disclosed subject matter.

One technical problem dealt with by the disclosed subject matter is to enhance a graphical representation of a quantum circuit. In some exemplary embodiments, one or more quantum circuits may be represented by a graphical representation, and displayed as part of a Graphical User Interface (GUI), via a screen, augmented/virtual reality display, or other display apparatus, to one or more users. In some exemplary embodiments, the graphical representation of a circuit may be displayed to one or more objectives, such as in order to assist users, quantum programmers, or the like, with understanding the structure and functionality of the represented quantum circuit. In some exemplary embodiments, some quantum algorithms may be easier to understand in a circuit diagram rather than in an equivalent written matrix representation. In some exemplary embodiments, the graphical representation may comprise any type of diagram, chart, graph, or visual cue that may visually represent one or more components of the quantum circuit. In some exemplary embodiments, the graphical representation may be displayed on a screen of an end device, or via any other component of a digital end device.

In some exemplary embodiments, a graphical representation (also referred to as the 'diagram') representing a quantum circuit may, in some cases, comprise a hierarchical diagram with one or more layers. In some exemplary embodiments, the hierarchical diagram may be used to portray the elements of the quantum circuit from a high-level layer to a low-level layer. In some exemplary embodiments, the high-level layer (also referred to as the 'functional layer') may depict functions or functional blocks implemented by the quantum circuit, while the low-level layer (also referred to as the 'gate-level layer') may depict gate level implementations of the functions. In some exemplary embodiments, the low-level layer may depict a decomposed or zoomed in version of the functional layer, a portion thereof, or the like, in which the functions are decomposed to their gate-level components.

In some exemplary embodiments, the layers of the hierarchical diagram may be organized according to a hierarchy. In some exemplary embodiments, a user may be enabled to navigate between layers of the diagram, such as by zooming in to the low-level layer or one or more portions thereof from the high-level layer, zooming out from the low-level layer to the high-level layer or portion thereof, or the like. In some exemplary embodiments, selecting a functional element (e.g., a function) in a functional layer of a diagram, may cause the gates from which the functional element is composed, to be presented to the user. For example, a user may be enabled to select a portion of the high-level layer (e.g., using a voice command, using a pointing device, by interacting with an associated control element of the GUI, or the like), in order to zoom into a gate-level implementation of the selected function or functional block. As another example, the user may zoom into the entire low-level layer from the high-level layer, where the entire low-level layer comprises a gate-level implementation of the entire high-level layer.

In some exemplary embodiments, a quality measurement of a diagram may be indicative of a clarity thereof, an esthetic aspect of the diagram, a level of noise or overlapping lines or other components of the diagram, a length of vertical lines or other elements of the diagram, or the like. In some exemplary embodiments, as the diagram is more clear, esthetic, and clean from overlapping lines, the structure and functionality of the circuit represented by the diagram may be more apparent to users, which may be useful for the users. For example, a diagram that clearly conveys the structure and functionality of the circuit to the user, may enable a programmer to detect bugs, to enhance the circuit, or the like.

In some exemplary embodiments, a quality measurement of a diagram may be defined by lengths of components of the diagram. For example, a quality measurement of a diagram may be defined based on lengths of functions, gates, or the like, that manipulate the qubits of the circuit represented by the diagram. In some exemplary embodiments, a length of a function, or any other manipulating component, may be measured based on the distance between the two farthest qubits (e.g., the two qubits that are visually displayed at the most extreme sides of the function) that are manipulated by the function. In some exemplary embodiments, a logical distance between two qubits may be defined according to a number of qubits that are positioned between the two farthest qubits. Additionally or alternatively, a physical distance between two qubits may be computed according to a physical distance between the two farthest qubits, such as a distance in pixels in the diagram, a distance in centimeters in the diagram, or the like. In some exemplary embodiments, the physical distance may be measured at a screen displaying the qubits, in a page displaying the diagram, or the like.

In some exemplary embodiments, greater lengths of diagram components may result with a lower quality diagram, and vice versa. For example, diagram components with great lengths may span or cover a relatively large portion of the diagram, may overlap with other diagram components, or the like, thereby rendering the diagram unclear and difficult to understand. This may be contrary to the purpose of the diagram, which may be intended for conveying to users in a clear manner the function and structure of the represented circuit.

In some exemplary embodiments, a length of diagram components may be affected by relative positions of the diagram's qubits, which may be ordered in a sequential manner. In some exemplary embodiments, the order of N qubits may be determined by a compiler, transpiler, or any processing unit that may assign logical or physical names, numbers, or the like to the qubits, according to which they may be positioned. For example, a diagram with N qubits may depict them in a sequential order from 1 to N, from 0 to N−1, or the like. In some exemplary embodiments, the numbers that are assigned to qubits may be used for identifying a qubit, assigning physical qubits to logical qubits, or the like, e.g., by a computer or simulator that are used to execute or simulate the quantum circuit. It is noted that such order is determined irrespective of a visual representation of the quantum circuit and is often aimed at creating a unique naming scheme for the qubits. Such an order may be determined, for example, based on a first-come-first-served ordering, such that each qubit is given a sequential number according to the first time the qubit was encountered during the processing of the quantum program. In some cases, numbers may be explicitly assigned to qubits by a programmer.

In some exemplary embodiments, the quality measurement of the diagram may be affected by an order of qubits that are presented in the high-level layer of the diagram. In some cases, the high-level layer presented by the diagram may be presented in a sub-optimal manner. In some exemplary embodiments, a diagram may be considered to be suboptimal in case a quality measurement thereof is below a threshold, in case one or more lengths of one or more functions thereof overpass a threshold, in case the quality measurement can be improved by one or more modifications, or the like. In some exemplary embodiments, although the assigned order of qubits may be optimal for one or more compilation processes, they may result with a suboptimal presentation of a diagram representing the circuit (e.g., in high-level layer, in low-level layer, or the like). It may be desired to overcome such drawbacks.

Another technical problem dealt with by the disclosed subject matter is to optimize a quality measurement of a low-level layer of the diagram. In some cases, zooming into the low-level layer may cause the quality measurement of the diagram to deteriorate, may result with a suboptimal quality measurement of the low-level layer of the diagram, or the like. In some exemplary embodiments, a challenge may arise when gates from which a function is composed, manipulate qubits that are far from each other in the functional layer, e.g., as depicted in FIGS. 1A-1B.

Referring now to FIG. 1A, showing an exemplary functional layer of a diagram. As illustrated in FIG. 1A, a functional layer of a diagram may depict a Function 100 that is implemented by a circuit, without depicting the function's internal components. Function 100 processes qubits $q_3$, $q_5$, $q_{10}$, $q_{14}$. Upon a user selecting Function 100, or based on any other user interaction or heuristics, the display may zoom into a gate-level layer of Function 100.

Figure 1B:
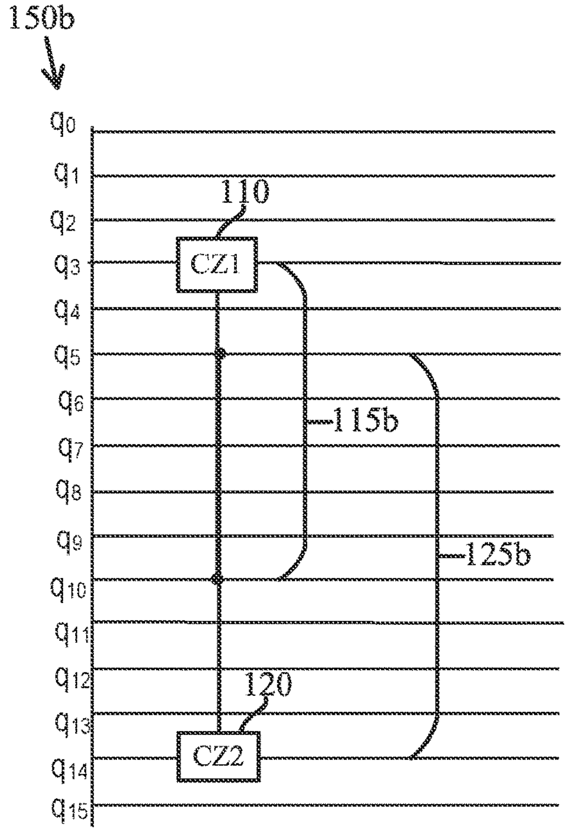

Referring now to FIG. 1B, showing exemplary gates of a gate-level layer of the diagram. In some exemplary embodiments, after selecting Function 100, the user may be presented with a display comprising one or more gates implementing Function 100. In some exemplary embodiments, gate-level components of Function 100 may comprise one or more components such as Components 110 and 120. For example, Components 110 and 120 constitute respective quantum gates that manipulate the qubits. Component 110, denoted CZ1, manipulates $q_3$, $q_{10}$, while Component 120, denoted CZ2, manipulates $q_5$, $q_{14}$. For example, Components 110, 120 may be a two-qubit gates, such as Controlled Z gates, CNOT gate, SWAP gate, or the like. As illustrated in FIG. 1B, Component 110 may manipulate $q_3$, $q_{10}$ that are positioned according to Order 150*b* in positions 3 and 10. Component 120 may manipulate $q_5$, $q_{14}$ that are positioned according to Order 150*b* in positions 5 and 14. Both components may also be configured to perform their respective manipulations at the same cycle. As can be appreciated, there is a relatively large distance between the relevant qubits (115*b*, 125*b*), and the connecting lines may even overlap, and require some form of visual manner of separation or distinction, such as using colors, shapes, using broken lines, elbow connector lines, non-straight lines, or the like. As can be appreciated Distance 115*b* may be measured to be 6, as six qubits that separate between $q_3$, $q_{10}$ in accordance with Order 150*b*. Similarly, Distance 125*b* may be 8, as eight qubits separate between $q_5$, $q_{14}$ in accordance with Order 150*b*. Such a measurement may be considered a logical distance. Additionally or alternatively, the length may be measured using pixels, metric distance, or other physical, non-logical measurement systems. As can be appreciated, this may adversely affect the quality measurement of the low-level layer of the diagram, at least since a length of a gate that comprises Components 110 and 120 may be greater than a threshold, due to overlapping, or the like.

According to this example, zooming into the low-level layer may degrade the quality measurement of the diagram, at least since the displayed connectors may be long, may not be esthetically appealing, may cross through other components of the diagram, may increase the complexity of the diagram, and may cause the gate-level layer to become unusable, unclear, render the diagram messy and difficult to understand, or the like. For example, when lines of the diagram cross each other, it may not be clear which components are connected to which qubits, whether lines merely cross each other or whether the components are intentionally coupled, or the like. In some exemplary embodiments, it may be desired to overcome such drawbacks, and enhance the clarity of the low-level layer of the diagram. For example, it may be desired to reduce the lengths of diagram components, as is illustrated by manner of example in FIG. 1C.

Yet another technical problem dealt with by the disclosed subject matter is to reduce the distance between qubits in a diagram that are manipulated by the same component (e.g., function, gate, or the like). For example, reducing a distance between qubits entering the same gate may reduce a length of the multi-qubit gates that are presented by a gate-level layer of a diagram. In some exemplary embodiments, a length of a multi-qubit gate may correspond to the distance between the farthest qubits that are manipulated by the gate. For example, a CNOT gate connecting qubits in positions 3 and 37 may have a length of 33 (e.g., a distance between the $3^{rd}$ element and the $37^{th}$ element (37-3-1), assuming the numbering of the qubits define the order therebetween). As another example, with respect to FIG. 1B, the length of a Component 110 may be based on a length of a vertical line between the relevant qubits, e.g., Distance 115*b*. Such a length may be calculated as the number of qubits between $q_3$ and $q_{10}$, which may be six (e.g., by reducing 3+1 from 10), or as a physical distance between $q_3$ and $q_{10}$. In some exemplary embodiments, in case that the qubits in the diagram are ordered according to qubit numbers that are assigned by a compiler, transpiler, or the like (e.g., Order 150*b*), a length of diagram components may be suboptimal in one or more scenarios. For example, long vertical lines may be presented between diagram components in case the qubit numbers assign two qubits that enter a same component with qubits that have a long distance between them, e.g., as depicted in FIG. 2.

Figure 2:
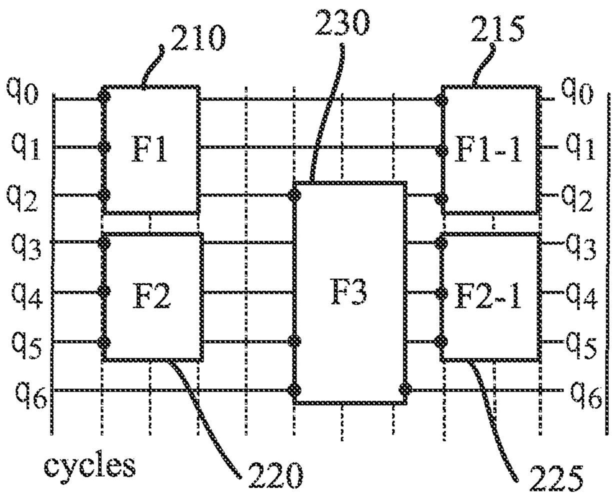
FIG. 2 shows an exemplary graphical representation of a quantum circuit, in accordance with some exemplary embodiments of the disclosed subject matter.

Referring now to FIG. 2, showing an exemplary functional layer of a diagram. In some exemplary embodiments, the functional layer may depict a first function, e.g., Function 210, which may manipulate qubits ordered in the first three positions, e.g., from $q_0$-$q_2$, and output a resulting state via an output qubit, denoted $q_2$. In some exemplary embodiments, the diagram may comprise a second function, e.g., Function 220, which may manipulate qubits ordered in the next three positions, e.g., $q_3$-$q_5$, and output a resulting state via an output qubit, e.g., denoted $q_5$. In some exemplary embodiments, a third function, e.g., Function 230, may obtain output qubits from Functions 210 and 220, such as by obtaining the output qubits $q_2$ and $q_5$, and manipulate the output qubits. In some exemplary embodiments, Function 230 may provide a resulting state via an output qubit thereof, denoted $q_6$. After the output qubits from Functions 210 and 220 are manipulated by Function 230, Functions 210 and 220 may be reversed, such as via Inverse Functions 215 and 225. For example, Functions 210 and 220 may comprise linear matrices, and Functions 215 and 225 may comprise inverse matrices thereof.

In some exemplary embodiments, in case a user navigates to a gate-level layer of Function 230, the positions of the qubits entering Function 230 may be suboptimal. In some exemplary embodiments, since Function 230 obtains output qubits from Functions 210 and 220, Function 230 may obtain qubits from non-adjacent positions, such as output qubits $q_2$ and $q_5$. In some exemplary embodiments, this may result in a gate-level layer of Function 230 including multi-qubit gates with a large length, with long vertical lines, or the like. For example, a gate that manipulates the farthest qubits $q_2$ and $q_6$ may have a vertical line of length 3, which may adversely affect a clarity of the diagram, and thus reduce the quality measurement of the gate-level layer of the diagram. In some exemplary embodiments, it may be desired to optimize a presentation of a diagram, such as by reducing a distance between qubits that enter a same gate, without adversely affecting the accuracy of the diagram.

One technical solution provided by the disclosed subject matter may comprise determining one or more separate qubit orders for qubits depicted by the diagram, which may differ from the order of qubits that is determined by a compiler. In some exemplary embodiments, an order of qubits may refer to a sequential numbering of qubits, according to which the qubits are positioned, or to adjusting positions of qubits without modifying their numbering. For example, determining an order of the qubits may comprise changing a numbering of the qubits, which may result with changing the positions of the qubits according to their new numbering, e.g., by reordering the qubits according to their new numbering. As another example, determining an order of the qubits may comprise retaining the number identifiers of the qubits while changing their relative positions.

In some exemplary embodiments, presenting qubits in a modified order may not harm the accuracy of the diagram. In some exemplary embodiments, the order of qubits determined by a logical compiler may merely comprise a logical order of qubits for a representation of a quantum circuit. In some exemplary embodiments, the logical order of qubits may, in many cases, not be used for the physical representation of the quantum circuit, the implementation code, or the like. For example, the logical order of qubits may not be used by a hardware compiler due to hardware constraints, hardware requirements, or the like, of a quantum computer executing the circuit, that may not be known or considered by the logical compiler. In some exemplary embodiments, the order of qubits for the logical representation may be determined by a logical compiler, while an order of qubits for the physical representation may be determined by a physical or hardware compiler. In some exemplary embodiments, the logical order of qubits may not necessarily be accurate, as it may not be used for executing the circuit. Accordingly, it may not be mandatory to utilize the logical order of qubits for the generated diagram, and changing the logical order in a diagram may not adversely affect an accuracy of the diagram.

In some exemplary embodiments, the term 'compiler', as used herein, may refer to any entity or component that is configured for translating a representation of a quantum circuit from one form to another. It is noted that the term 'compiler' may also include a transpiler. In some exemplary embodiments, a logical compiler may refer to a processing component that obtains a functional-level representation of a quantum circuit and converts it, or portion thereof, to a gate-level representation of the quantum circuit. In some exemplary embodiments, a hardware or physical compiler may refer to a processing component that obtains a gate-level representation of a quantum circuit, or portion thereof, and converts it to an executable quantum circuit for a specific target quantum computer. In some exemplary embodiments, the executable quantum circuit may comprise a machine representation that can be executed by a quantum computer, simulated by a quantum simulator, or the like.

In some cases, a logical compiler may generate a logical representation of a quantum circuit having a first order of qubits based on one or more constraints of the circuit, such as connections between qubits, an order of manipulations of gates or functions, or the like. A hardware compiler that may be aware of constraints of a quantum computer or simulator that is being used, may obtain the logical representation of the circuit, and allocate physical qubits for the logical qubits. The physical qubits may be enumerated according to a second order of qubits that may be different from the first order of qubits. In some exemplary embodiments, the hardware compiler may allocate physical qubits for respective logical qubits, allocate physical gates for the logical gates, or the like, thereby synthesizing an executable circuit for a quantum computer.

In many cases, the order of qubits that is explicitly or implicitly determined by the logical compiler ('the existing order') may be used also for generating a diagram representing the circuit. However, using an identical order of qubits for both the compiler and the diagram may result with the above enumerated drawbacks, at least since the existing order may be determined in order to comply with compilation objectives, which may not necessarily be relevant to the objectives of the diagram generation. In some exemplary embodiments, instead of utilizing the existing order, the disclosed subject matter provides a technical solution of determining one or more new, separate, orders of qubits for the diagram, which may differ from the order of qubits that is determined by the logical compiler and potentially be inconsistent therewith (e.g., having at least one contradiction where a first order defines, with respect to qubits a and b, that a<b, while the second order defines the opposite: b<a, meaning that qubit b is positioned before qubit a). In some exemplary embodiments, utilizing a separate order of qubits for generating the diagram may result with several distinct orders of qubits: the existing order of qubits determined by the logical compiler, and one or more new orders of qubits determined for the diagram. In some exemplary embodiments, the disclosed subject matter may include an additional order—a physical order of qubits determined by the hardware compiler, which may be different and potentially inconsistent with the one or more new orders determined for the diagram. For example, the physical order of qubits may be determined based on the existing order of qubits and on hardware constraints.

In some exemplary embodiments, an ordering scheme may define one or more new orders of qubits for the diagram. In some exemplary embodiments, the ordering scheme may determine the new orders of qubits based on one or more objective functions, which may be optimized by one or more optimization processes. For example, the ordering scheme may be configured to optimize a quality measurement of the diagram by minimizing or maximizing one or more objective functions applied to the representation of the quantum circuit.

In some exemplary embodiments, an objective function may be configured to obtain an indication of an order of qubits that is to be applied when generating a diagram for a circuit. In some exemplary embodiments, for each indicated order of qubits, the objective function may be configured to generate a diagram using the indicated order of qubits, and calculate one or more scores based on the lengths of diagram components in the generated diagrams. Alternatively, an objective function may be configured to obtain a representation of a diagram that is generated using the order of qubits, and to calculate one or more scores based on the lengths of diagram components in the obtained diagram. For example, a score of an objective function may include a sum of lengths of diagram components that is associated to an inspected diagram.

In some exemplary embodiments, an optimization process may be configured to utilize the objective function in order to optimize a quality measurement of a diagram generated for a circuit. For example, an optimization process may be configured to send to an objective function indication of each possible order of qubits, or a subset thereof, and obtain resulting scores from the objective function. According to this example, the objective function may yield different scores for different orders of qubits. In some exemplary embodiments, the optimization process may be configured to select an order of qubits that results with a best score, e.g., a score indicating minimal lengths of diagram components. For example, the optimization process may utilize one or more search algorithms, heuristics, or the like, in order to avoid the need of testing every possible order of qubits. In some cases, the optimization process may be configured to generate diagrams for every possible order of qubits, or portion thereof. The optimization process may send each generated diagram to an objective function, and obtain resulting scores from the objective function. In some exemplary embodiments, the optimization process may be configured to select an order of qubits that results with diagram that obtained a best score from the objective function, e.g., a score indicating minimal lengths of diagram components.

In some exemplary embodiments, the one or more objective functions may comprise global objective functions, local objective functions, a combination thereof, or the like. For example, global objective functions may be applied globally, to an entire functional layer or gate-level layer, while a local objective function may be applied locally to a portion of a layer. In some exemplary embodiments, the ordering scheme may be configured to enhance a visual presentation and clarity of the diagram, thereby increasing a quality level of the diagram. For example, selecting an order of qubits that minimizes the lengths of diagram components may optimize a quality level of the resulting diagram.

In some exemplary embodiments, the usage of one or more global objective functions may result with an enhanced order of qubits, which may result with an overall enhanced diagram that has a better quality than a diagram using the existing order of qubits, e.g., a cleaner and a clearer representation thereof. For example, when a user zooms from a functional layer into a gate-level layer of a diagram, a global optimization process may be used for finding an optimal order of qubits for the gate-level layer. In some exemplary embodiments, although the usage of global objective functions may result with an enhanced diagram, the determined new order of qubits may not necessarily optimize locally for one or more sections or portions of the layer.

Figure 1C:
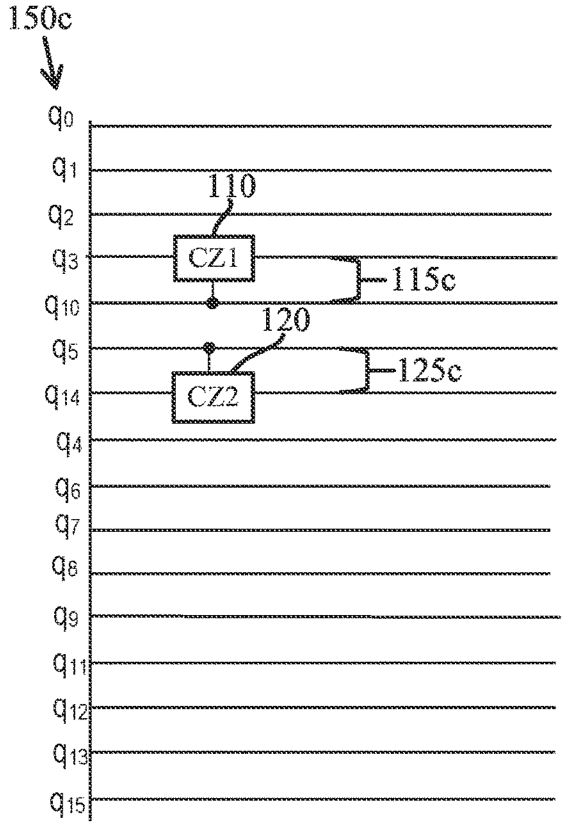

Referring now to FIG. 1C, showing an Order 150*c* that may be obtained from applying a global optimization process on a gate-level layer of the circuit. For example, an optimization process may utilize an objective function to score different orders of qubits for the gate-level layer, and may select an optimal order to include Order 150*c*. In some exemplary embodiments, Order 150*c* may be an alternative order and is inconsistent with Order 150*b*. Specifically, Order 150*c* ordered qubits $q_3$, $q_5$, $q_{10}$, $q_{14}$ differently than in Order 150*b*. Instead of $q_3$, $q_5$, $q_{10}$, $q_{14}$ being ordered ($q_3, \ldots, q_5, \ldots, q_{10}, \ldots, q_{14}$), Order 150*c* orders them ($q_3$, $q_{10}$, $q_5$, $q_{14}$), in a manner contradicting Order 150*b*. It is also noted that $q_3$, and, $q_{10}$, are ordered to be directly subsequent to one another, as opposed to the situation defined in Order 150*b*, where six qubits are located therebetween. As can be appreciated, in view of the different order, Distance 115*c* is decreased with respect to Distance 115*b* (as there are no qubits in between $q_3$, and $q_{10}$). Similarly, Distance 125*c* is decreased with respect to Distance 125*b* (as there are no qubits in between $q_5$, and $q_{14}$). It is further noted that in view of the different order of the qubits, no overlapping exists between the visual representations of Components 110, 120. In some exemplary embodiments, the diagram shown in FIG. 1C may be considered as having a higher quality measurement when compared to the diagram of FIG. 1B.

In some cases, the diagram may be locally optimized, such that one or more sections of a layer are locally optimized. In some exemplary embodiments, an optimization process may first apply a global objective function to the entire layer to determine a new order of qubits, and subsequently, the optimization process may apply a local objective function to one or more sections of the layer to determine locally optimized ordering of qubits for the sections. In some exemplary embodiments, in order to achieve local optimization of a diagram, a switching scheme may be implemented for switching an order of qubits between sections of a single layer. In some exemplary embodiments, since a separation exists between the order of physical and logical qubits, changing the order of the qubits throughout different sections of the diagram, different layers of the diagram, or the like, may not adversely affect an accuracy of the diagram. In some exemplary embodiments, the switching scheme may be configured to further enhance the quality measurement of the diagram, by optimizing the quality measurement of the diagram also on a local level.

In some exemplary embodiments, the switching scheme may determine one or more section orders of qubits for respective sections of a layer. In some exemplary embodiments, the section orders of qubits may be determined based on one or more local objective functions that may be applied locally, on sections of the layer. In some exemplary embodiments, a local objective function may be defined with respect to a section of the diagram, and not with respect to the entire diagram. For example, the optimization process may apply a local objective function on a subset of cycles of the quantum circuit, on a subset of qubits of the quantum circuit, or the like. In some exemplary embodiments, the switching scheme may be configured to execute one or more local optimization processes in order to maximize, or minimize, one or more local objective functions with respect to a section. In some exemplary embodiments, the switching scheme may be configured to execute one or more objective functions on a section of a layer using different orders of qubits, e.g., all possible orders of qubits, and determine which order of qubits results with a best score from the objective function. For example, a best score may comprise a score that indicates that a sum of the lengths of diagram components (e.g., gates) within the inspected section is minimal compared to other scores that were obtained for other orders of qubits. For example, a same objective function that is applied globally as part of the global optimization, may be applied locally by the switching scheme on each section. As another example, a different objective function may be applied to local sections of a layer.

In some exemplary embodiments, an output from the local optimization processes may comprise a section order of qubits that, when applied to a section of a layer, minimizes the lengths of the gates, or any other manipulating components, within the section. In some exemplary embodiments, the switching scheme may enable to reorder the qubits for separate sections of the diagram, in a manner that minimizes the lengths of diagram components within the section. For example, a section of the diagram may be defined between one or more cycles of the circuit. In some exemplary embodiments, a section of the diagram may comprise a portion of a layer of the diagram. For example, a section of the diagram may comprise a gate-level implementation of a single zoomed-in element of the functional layer, that may be presented in response to a user selection of the element in the high-level layer. As another example, a layer may depict multiple elements (e.g., gates, functional blocks, or the like), and a section of the diagram may comprise a single depicted element thereof, or a subset of depicted elements.

In some exemplary embodiments, one or more optimization processes may be configured to select when and whether to apply local optimization processes, in a manner that optimize scores of objective functions, while minimizing a number of switches between sections of a layer. In some cases, a quality score of a diagram may be negatively correlated to a number of switches between sections, since too many switches may render the diagram unclear. In some cases, a quality score of a diagram may be negatively correlated to lengths of components in the diagram, as greater lengths may decrease the quality score and lesser lengths may increase the quality score. A tradeoff between the metrics may be define by a user, by a default setting, by a classifier, or the like.

It is noted that the global and local optimizations may be performed in parallel, or separately. For example, in some cases, only global optimization may be implemented for a layer of a diagram. In other cases, only local optimization may be implemented for one or more sections of the layer. In other cases, both global and local optimization may be implemented for the layer. For example, a global optimization may be first utilized to determine an initial order of qubits, and local optimizations may be used to adjust one or more subsequent sections of the layer. It is further noted that any other alternative objective functions may be used, such as based on different quality definitions, user requirements, or the like. For example, in some cases, a score of an objective function being high may indicate that the lengths of the diagram component are small, while in other cases a score of an objective function being low may indicate that the lengths of the diagram component are small.

Figure 3A:
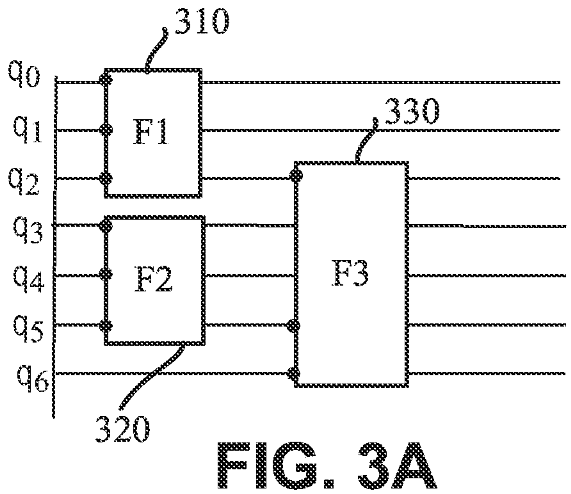
FIGS. 3A-3B illustrate exemplary graphical representations of a quantum circuit, in accordance with some exemplary embodiments of the disclosed subject matter.
Figure 3B:
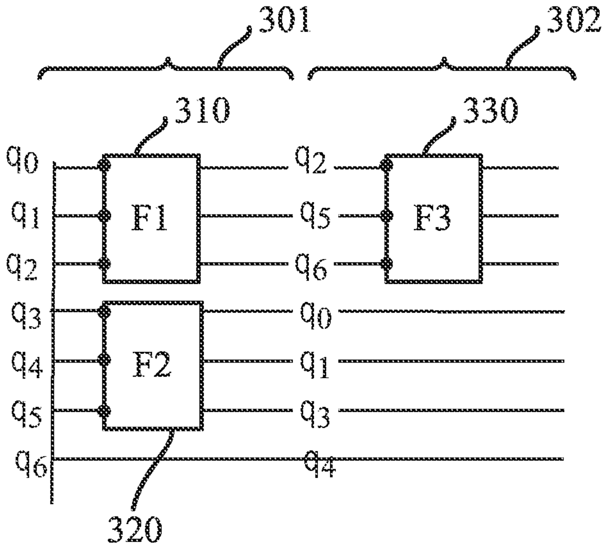

Referring now to FIGS. 3A-3B, showing exemplary diagrams in which the switching scheme may be implemented, in accordance with some exemplary embodiments of the disclosed subject matter.

As depicted in FIG. 3A, a functional layer of diagram may depict a Function 330 that obtains output qubits from Functions 310 and 320. It is noted that Function 330 may correspond to Function 230 of FIG. 2, and that Functions 310 and 320 may correspond to Functions 210 and 220 of FIG. 2, respectively.

In some exemplary embodiments, in order to decrease the length of Function 330, a switching scheme may be implemented, as depicted in FIG. 3B. In some exemplary embodiments, the diagram may be split into one or more sections: Section 301, Section 302, or the like. For example, the split may be performed in response to determining that the length of Function 330 is suboptimal, or based on any other determination. In some exemplary embodiments, the switching scheme may determine an optimized section order of qubits for Section 302, such as by applying a local objective function to Section 302 with multiple orders of qubits, and identifying an optimal order of qubits that results with a best score. In some cases, an 'optimal order', as used herein, may refer to an optimal order, a near-optimal order, or the like. For example, a local optimal order for a section may not necessarily be optimal for every subsection of the section. The optimal order of qubits may be applied to the section. For example, as depicted in FIG. 3B, the qubits entering Function 330 may be reordered in the middle of the diagram, by positioning the qubits $q_2$, $q_5$, and $q_6$ in adjacent position for Section 302 of the diagram. In some exemplary embodiments, the switching scheme may not switch the order of Section 301, at least since both Functions 310 and 320 may already obtain qubits in adjacent positions, which may result with a high quality measurement of Section 301 in both the functional layer and the gate-level layer. In other cases, a global optimization process may be used to determine the order of FIG. 3A, and a local optimization process may be used to determine the order of Section 302. For example, a global optimization may result with the diagram of FIG. 3A, which optimize the overall lengths of the functions although not optimizing the length of Function 330. In some cases, in order to clarify to the user which qubits were reordered, one or more visual indications of the switching may be placed between the sections, e.g., similar to the visual indications illustrated in FIG. 5.

In some exemplary embodiments, the diagram may be divided into sections at any portion or area of the layer that complies with one or more constraints. In some exemplary embodiments, a constraint may define that a border between sections may be required to include a cycle or window slot of the diagram that does not split a circuit component such as a function into two. For example, a border between first and second sections may be determined so that there is no circuit component that is characterized in having a first portion in the first section and a second portion in the second section, unless a relative order of qubits utilized by the circuit component is not affected by the switching scheme. In some exemplary embodiments, a constraint may define that, in case a border between sections splits a circuit component into two, the qubits that are manipulated by the circuit component must retain their previous numbering. For example, in case third, fourth and fifth qubits are manipulated by a circuit component that has a first portion in a first section and a second portion in a second section, the switching scheme may not switch the positions of the manipulated qubits. According to this example, the switching scheme may switch positions of any other qubits (e.g., the first and second qubits, the sixth qubit, or the like.

In some exemplary embodiments, any other constraints on splitting a layer to sections may be defined, such as based on user preferences, heuristics, optimization objectives, or the like. For example, the diagram may be separated into sections that correspond to a defined number of cycles, such as every 4 cycles, and in case a border between sections does not comply with a constraint (e.g., the border separated a function to two portions, the border separates a circuit component into two and a relative order of qubits utilized by the component is affected by the switching scheme, or the like), the border may be moved to the nearest adjacent position that does comply with the constraint. As another example, the layer may be separated into sections in case a function (or gate) that manipulate non-adjacent qubits is identified, such that the function is placed within a first section and the remaining layer portions are placed in a separate section. According to this example, in case many functions that manipulate non-adjacent qubits are identified, each such function may be allocated a separate section. In some cases, functions that manipulate non-adjacent qubits may be allocated to a separate section only in case the distance between the farthest qubits complies with a threshold. In other cases, functions that manipulate non-adjacent qubits may be allocated to a separate section regardless of the distance. For example, with respect to FIG. 3B, Function 330 may be identified as manipulating non-adjacent qubits, and the switching scheme may allocate to Function 330 a section with borders that do not violate constraints, e.g., a nearest border before Function 330 that does not split functions or violate a relative order of qubits manipulated by split functions. In some exemplary embodiments, the diagram may be separated into sections based on any other rules, heuristics, segmentation classifiers, or the like.

In some exemplary embodiments, groups of qubits that are manipulated by a same function (or gate), that enter the function, or the like, may be reordered so that they positioned in adjacent positions. This may be performed implicitly, by applying a local or global optimization process on a section that includes the function, or explicitly, such as by defining rules that reorder the qubits to adjacent positions as part of the switching scheme. For example, the switching scheme may be explicitly required to comply with a constraint defining that qubits that are manipulated by a same gate or function must be positioned adjacently to each other, as much as possible, in a new determined order of qubits. As another example, the switching scheme may be explicitly required to comply with a constraint defining that local optimization must be performed for any function identified as manipulating qubits with distances that violate a threshold. In other cases, an optimization process may automatically position such qubits in adjacent or nearly adjacent positions, when applied locally to the function. In some exemplary embodiments, ordering such qubits in adjacent positions may reduce the length of the function, the gate, or the like, and thereby increase a quality measurement of the layer.

In some exemplary embodiments, local optimization processes may not always be applied to sections of a layer, or may be applied to some sections and not to others. In case that a first section of a layer is locally optimized but the second is not, the second portion may retain the section order of qubits of the first section. In some exemplary embodiments, one or more local optimization processes may be utilized for a section, in case that they significantly enhance the quality measurement of the respective section, compared to not utilizing the local optimization processes. For example, a quality measurement of the section with the section order of qubits may be compared to the quality measurement of the section with the previous order of qubits, which may comprise an order of the global optimization processes, an original order of the compiler, a section order that was used for a previous section and was not modified by subsequent sections, or the like. In some exemplary embodiments, the section order of qubits for the section may be estimated to significantly enhance the quality measurement of the section, in case a difference in quality complies with a threshold.

For example, with respect to FIGS. 3A-3B, a global optimization process may be executed for the entire functional layer of the diagram, resulting with the layer depicted by FIG. 3A. The global optimization process may utilize an objective function to determine scores for multiple different orders of qubits, and select an order of qubits that results with a smallest sum of the lengths of the functions (Functions 310-330) in the layer. A local optimization process may then be used to execute the same objective function, or a different objective function, to sections of the layer, from the leftmost section to the rightmost section (e.g., from Sections 301 to 302). In other cases, the local optimization process may only be executed on specific sections, such as sections that comprise an element that manipulate qubits of a distance that is greater than a threshold. In some cases, the local optimization process may only be executed on a section that is indicated or selected by a user. For example, a user may instruct to reorder a section via a GUI control element, a voice command, or the like. The user may provide the user's manual section selection, such as by selecting a rectangle in the diagram (e.g., covering a set of qubits and respective cycles), by visually selecting respective cycles and manually naming the relevant qubits, by providing an instruction explicitly indicating a set of qubits within a range of cycles, by using a light-cone analysis with a defined length, by indicating a high-level program artifact thereby implicitly selecting cycles and qubits involved in the implementation of the high-level program artifact, or the like.

The objective function may determine, for an underlying section with an indicated order of qubits, a sum of the lengths of the functions in the section when using the indicated order of qubits for the section. The best score may be compared to a score of the objective function that is obtained when retaining the previous order of qubits. In case of Section 301, the previous order may include the order of qubits that was determined by the global optimization process. In case of Section 302, the previous order may include any new order that may be implemented by Section 301, or the order of qubits that was determined by the global optimization process (in case the switching scheme has not changed the order of qubits for Section 301). In some exemplary embodiments, the switching scheme may determine a difference or gap between the scores, and compare the difference to a threshold. In case that the difference is significant, e.g., is greater than the threshold, the order of qubits that was determined by the local optimization process may be used for the section, instead of the previous order. Otherwise, an order of qubits that was used for a previous section may be retained without change. In some exemplary embodiments, this process may be performed for one or more succeeding or non-adjacent sections of the diagram, from left to right.

One technical effect obtained by the disclosed subject matter is enhancing a quality measurement of a diagram depicting a quantum circuit. In some exemplary embodiments, an increased quality measurement of the diagram may cause attributes and functionalities of quantum algorithms being used to be efficiently conveyed to users, such as programmers, who may view the diagram. Being informed of the attributes and functionalities of the quantum circuit may increase a productivity and efficiency of quantum programmers, a quantum circuit development process, or the like.

Another technical effect obtained by the disclosed subject matter is providing a global ordering scheme that defines a new order of qubit for a layer of the diagram. The new order may be of better quality than the existing order determined by the logical compiler. In some exemplary embodiments, the ordering scheme may utilize one or more global objective functions in order to optimize the quality measurement of the layer.

Yet another technical effect obtained by the disclosed subject matter is providing a local switching scheme that defines a new order of qubit for a section of a layer of the diagram. The disclosed switching scheme enables to optimize a presentation of diagram sections using local optimization processes, so that the resulting section is user friendly and easy to understand. In some exemplary embodiments, a switching scheme may separate the diagram to sections and apply switches in the order of the qubits throughout a layer of the diagram, based on one or more local objective functions. In some exemplary embodiments, changing the order of the qubits for different sections may reduce the length of functions or gates within the section and enhance the visual presentation and clarity of the diagram.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Figure 4:
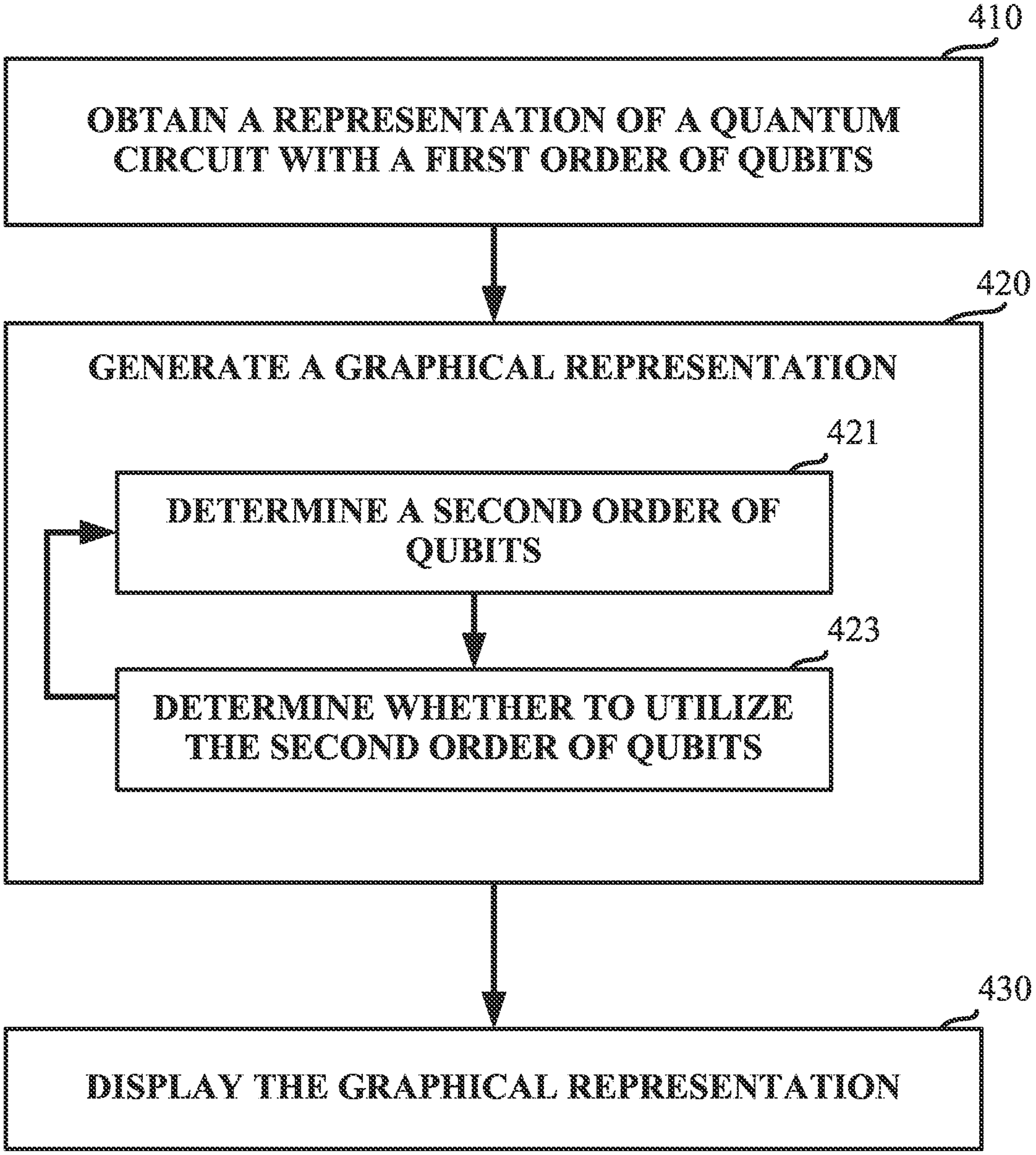
FIG. 4 shows an exemplary flowchart diagram of a method, in accordance with some exemplary embodiments of the disclosed subject matter.

Referring now to FIG. 4, showing an exemplary flowchart diagram of a method, in accordance with some exemplary embodiments of the disclosed subject matter.

On Step 410, a representation of a quantum circuit may be obtained. In some exemplary embodiments, the quantum circuit may be configured to manipulate a plurality of qubits over a plurality of cycles. In some exemplary embodiments, the representation of the circuit may define, explicitly or implicitly, a first order of the plurality of qubits, such as from $q_0$ to $q_{n-1}$ for n qubits. In some exemplary embodiments, the first order may comprise a logical qubit order that is ordered and/or numbered by a logical compiler. For example, the first order may be obtained from a logical compiler that outputted, as part of a compilation process, the representation of the quantum circuit. According to this example, the logical compiler may explicitly or implicitly define the first order by a naming of the plurality of qubits provided in the representation of the quantum circuit.

On Step 420, based on the representation of the quantum circuit, a graphical representation of the quantum circuit may be generated. In some exemplary embodiments, the graphical representation may comprise a functional layer representing functions of the circuit, a gate-level layer representing a gate-level implementation of the functions, a combination thereof, or the like. In some exemplary embodiments, at least one portion of the graphical representation may be configured to be presented to a user, such as based on a user instruction to present a layer, based on any other user instruction, based on a default setting, or the like. For example, the generation of the graphical representation may be performed iteratively for every user instruction to zoom in or out from a layer, a selection of a layer portion, or the like. In some exemplary embodiments, the graphical representation may be generated according to Steps 421 and 423, e.g., as follows.

On Step 421, a second order of the plurality of qubits may be determined. In some exemplary embodiments, the second order of the plurality of qubits may be different from the first order of the plurality of qubits that is obtained from the logical compiler.

In some exemplary embodiments, the second order of qubits may be determined based on an objective function, e.g., a local objective function, a global objective function, a combination thereof, or the like. In some exemplary embodiments, a global objective function may refer to an objective function that determines lengths of all of the circuit components within an entire layer, while a local objective function may refer to an objective function that determines lengths of circuit components within a specific section of the layer, that does not comprise the entire layer. For example, a first circuit component in a layer may be included in the section, and a second circuit component may not be included in the section. In some exemplary embodiments, a global objective function may be applied globally for the entire layer, while a local objective function may be applied locally for the section of the layer alone. In some exemplary embodiments, the global and local objective functions may comprise a same objective function. For example, applying an objective function locally on a portion of the layer may result with summing up lengths of circuit components within the portion, while applying an objective function globally on an entire layer may result with determining lengths of all the circuit components within the layer.

In some exemplary embodiments, in case that the graphical representation includes a gate-level layer, the circuit components within the layer may comprise quantum gates, and the objective function may be configured to obtain an indication of an order of qubits and of the quantum circuit, and determine, for a respective diagram, lengths of the gates. For example, quantum gates may include identity gates, Pauli gates, square root of NOT gates, controlled gates, CNOT gates, CX gates, CY gates, CZ gates, phase shift gates, controlled phase shift gates, Hadamard gates, swap gates, Toffoli gates, or the like. In some exemplary embodiments, lengths of the gates comprise, for each gate, a logical or physical distance between two farthest qubits that are manipulated by the gate. In some exemplary embodiments, in case that the graphical representation includes a functional-level layer, the circuit components within the layer may comprise quantum functional blocks, and the objective function may be configured to obtain an indication of an order of qubits and of the quantum circuit, and determine lengths of the functional blocks, which may comprise, for each functional block, a distance between two farthest qubits that are manipulated by the functional block. In some exemplary embodiments, a functional block may be a logical abstraction of a sub-circuit having a predetermined functionality. In some exemplary embodiments, a functional block may represent a sub-circuit that is executed over two or more cycles, using two or more qubits, using two or more quantum gates, or the like.

In some exemplary embodiments, the second order may be determined by solving an optimization problem with respect to the objective function. In some exemplary embodiments, the optimization problem may be solved by an optimization process, which may be configured to search for orders of qubits that result with a minimal or maximum scores of the objective function. In some cases, solving the optimization problem may comprise finding an order of qubits that results with a best score from an objective function, compared to other orders of qubits. For example, a best score may comprise a score that is associated with a smallest sum of lengths of circuit components. For example, in case that an order of qubits 1, 3, 5, 2, 4 of the logical compiler resulted with a score that indicates a sum of 35, and a different order of qubits 5, 3, 1, 4, 2, resulted with a score that indicates a sum of 23, the optimization process may select the second order of qubits to include the order that obtained a better score with a lower sum of lengths of circuit components, e.g., the order 5, 3, 1, 4, 2.

In some exemplary embodiments, when performing local optimization to a section of a layer, the local objective function may be applied to at least one of first and second disjoint non-empty sections of the layer, and a switching scheme may be implemented between the first and second sections. In some exemplary embodiments, the switching scheme may be configured to generate the graphical representation to be split into two or more sections, such that at least a first section and a second section utilize different orderings of the qubits. In some exemplary embodiments, the switching scheme may be configured to utilize a first section order of qubits for the first section, and a second section order of qubits for the second section. As an example, the first section order of qubits may include an order determined by a global optimization of the entire layer or multiple sections thereof, a local optimization of the first section, an original order obtained from the logical compiler, or the like. According to this example, the second section order of qubits may retain the previous order of qubits of the first section, or switch them according to a local optimization of the second section. As another example, the first section order of qubits may include a local optimization of the first section, and the second section order of qubits may include a local optimization of the second section, e.g., based on applying the local objective function on each section.

In some exemplary embodiments, the switching scheme may generate the graphical representation to be split into first and second sections based on a determination that a circuit component in one of the sections manipulates non-adjacent qubits, and that a section that contains the circuit component can be separated from the remaining portions of the layer within one or more proper borders. In some exemplary embodiments, the first and second sections may be considered to have proper borders in case the borders are absent of a circuit component (e.g., a gate, a function, or the like) that has a first portion in the first section and a second portion in the second section. In some exemplary embodiments, the first and second sections may be considered to have proper borders in case a border between the sections splits a circuit component into two, and the qubits that are manipulated by the circuit component retain their previous numbering.

In some cases, instead of using an optimization process to find an optimal order of qubits for each section, in some cases, an optimal order may be obtained directly from a library. In some exemplary embodiments, one or more libraries, artifacts, or the like, may retain optimal translations of a quantum circuit section, layer, or the like, to respective optimal orders of qubits that minimize sums of circuit components lengths, to respective drawings that use the optimal orders of qubits, or the like. For example, a library may comprise prepared drawings of diagram portions that are reordered with optimal qubit orderings. In some exemplary embodiments, a library may retain a mapping between a representation of a circuit or a subcircuit, to a respective diagram with optimal qubit ordering. In some cases, the library may be used to identify diagram portions for different portions of the circuit, and combine them together using a switching scheme between each independent section.

In some exemplary embodiments, when attempting to perform a local or global optimization to a layer or section of the diagram, the library may be first queried in order to search for an optimized implementation (order of qubits, drawing, or the like) for the layer or section. For example, when the user drills down to a gate level implementation of a function, the prepared library conversions may be used for presenting the circuit in an optimal order of qubits (in case the library retains a prepared conversion thereof). In some exemplary embodiments, such libraries may be maintained with a function instance, at a local memory, at a remote server, or the like. In some exemplary embodiments, the library conversions may be shared between the compiler and the code that draws the quantum circuit. In some exemplary embodiments, using library conversions of sections to drawings may be useful, as it may preserve memory and computational resources.

On Step 423, a determination as to whether the second order of qubits, that is determined at Step 421, should be utilized for generating the final graphical representation of the quantum circuit, may be performed. In some exemplary embodiments, the final graphical representation may be configured to be presented to a user. In some exemplary embodiments, in case that the second order of qubits is obtained from performing a global optimization to an entire layer, the second order of qubits may be utilized for generating the final graphical representation of the layer. In some exemplary embodiments, in case that the second order of qubits is obtained from a local optimization of a section, the second order of qubits may or may not be utilized for the respective section, based on one or more calculations, determinations, indications, or the like.

In some exemplary embodiments, in case that a global optimization is first applied to the entire layer, individual sections of the layer may implement a local optimization only in case that the local optimization improves the quality measurement of the section in a significant manner, compared to the global optimization. For example, a best score that is obtained from applying the objective function on a section of the graphical representation using an optimal order of qubits may be determined, and compared to the score of the section that is obtained when using the globally determined order for the section. In some exemplary embodiments, the scores may be compared, and in case a difference between the scores is greater than a threshold, indicating that the local optimization is significantly better than the global optimization with respect to the section, the order of qubits determined by the local optimization may be used for the section instead of the global optimization.

In some exemplary embodiments, Steps 421 and 423 may be performed iteratively, such as by determining a second order of qubits for layers of the diagram, for one or more sections of the diagram (e.g., from left to right), and determining whether to utilize each determined second order. In some exemplary embodiments, in a first iteration, the second order of qubits may comprise a global order of the qubits that is determined by the global optimization. In some exemplary embodiments, the global order may be utilized for the layer, and then a determination may be made as whether to apply one or more local optimizations to one or more sections of the layer. In some exemplary embodiments, upon modifying the global order of a layer by a section of the layer, the determination as to whether or not to perform local optimization to any subsequent section may be performed with respect to the modified section. For example, a layer may comprise three section, to which a global order of qubits is applied. A local optimization may be applied to a second section, upon determining that a difference between an optimal score of the second section when using local optimization is significantly better than a score of the second section when using the global order of qubits. The local optimization may result with using a second order of qubits for the second section, instead of retaining the global order. When determining whether or not to utilize local optimization for the third section, the optimal score of the third section may be compared to the score of the third section when utilizing the second order of qubits for the second section (instead of the global order of qubits). In case the scores are significantly different, the local optimization may be applied to the third section, and vice versa.

In some cases, a Constraint Satisfaction Problem (CSP) problem may be defined and utilized for determining whether the second order of qubits should be utilized for generating the graphical representation. In some exemplary embodiments, a CSP solver may be defined for minimizing the objective functions' scores for the layer, sections thereof, or the like. In some cases, a CSP solver may also attempt to minimize a parameter including the number of switches between sections with different qubit orderings (e.g., according to a determined tradeoff, a constraint on a ratio of switches per cycles, or the like). According to this example, the CSP solver may provide an optimal scheduling indicating whether global optimization should be performed for the layer, and whether local optimization should be performed for each section. In some exemplary embodiments, a CSP problem may be defined for one or more purposes, such as for defining optimal division to sections, define orders of qubits that place qubits that enter the same function in adjacent positions, or the like.

On Step 430, the graphical representation that is generated on Step 420 may be presented, displayed, or the like, to a user. For example, the graphical representation may be presented via a screen of an end device, an augmented reality device, a projected display, a printed paper sheet, or the like. In some cases, displaying the graphical representation of the quantum circuit may comprise displaying a functional-level layer in accordance with one or more second orders of qubits, displaying a gate-level layer in accordance with one or more second orders of qubits, or the like.

In some exemplary embodiments, the graphical representation may enable a user to navigate between one or more layers of a diagram, to zoom in to an implementation of one or more functions, or the like. In some cases, the graphical representation may comprise at least one layer that is reordered in the middle of the layer, between two sections thereof. In some exemplary embodiments, the graphical representation may be dynamically adjusted based on user interactions with the diagram, such as a user selection of a section of a layer, a user selection of a navigation control between layers, or the like. For example, a functional element may be displayed in a functional-level layer of the graphical representation using a determined second order of qubits (e.g., a global or local order). In response to a user selection of the functional element, a gate-level layer of the functional element may be displayed using a third order of the plurality of qubits or portion thereof, which may be inconsistent with the second order of qubits. In some cases, the graphical representation may enable a user to select a circuit component, such as a gate, in order to direct the user to an implementation code of the selected element, a light cone analysis thereof, or the like.

In some exemplary embodiments, multiple qubits ('registers') that cooperatively represent a single quantum state, data structure, or the like, may be displayed in the graphical representation together, e.g., by marking or representing them with a single qubit in the diagram. In some exemplary embodiments, auxiliary qubits may not be allocated by a programmer, and therefore may not be of interest to the programmer. In some exemplary embodiments, auxiliary qubits may not be presented in the graphical representation. In some exemplary embodiments, auxiliary qubits may be presented in the graphical representation separately from the remaining qubits, such as using different visual cues, different colors, separate locations, or the like.

Figure 5:
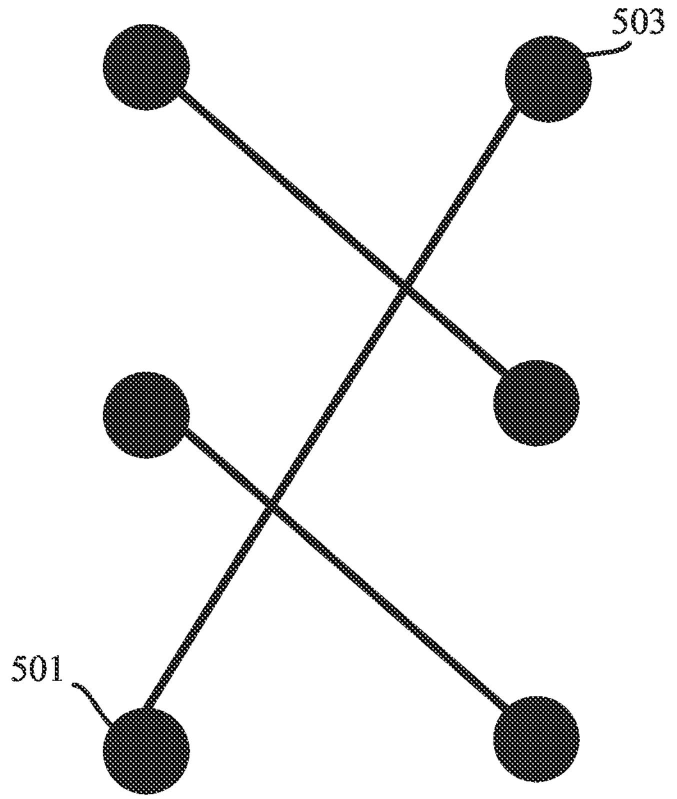
FIG. 5 shows an exemplary visual indication, in accordance with some exemplary embodiments of the disclosed subject matter.

In some exemplary embodiments, in case of a switching session between two sections of a layer, the graphical representation may be configured to present one or more indications of switched qubit positions, e.g., as depicted in FIG. 5. Referring now to FIG. 5, showing an exemplary visual indication, in accordance with some exemplary embodiments of the disclosed subject matter. As illustrated in FIG. 5, in order to clarify to the user which qubits were reordered from first positions in a first section to second positions in a second section, one or more visual indications of the switching may be presented in a location of the display that is placed between the two sections. For example, the visual indication may indicate that a qubit has been moved from a Third Position 501 in a first section, to a First Position 503 for a subsequent section of the layer. In some cases, Third Position 501 may comprise any position of a qubit that has at least two qubits positioned before it. For example, Third Position 501 may comprise a tenth position, where the first seven positions are not depicted.

In some exemplary embodiments, a line or any other connection cue may be placed between a previous and subsequent position of a same qubit, to indicate that the qubit has moved from the previous position to the subsequent position. For example, as illustrated in FIG. 5, a line is depicted between Third Position 501 and First Position 503. In some exemplary embodiments, the visual indication of the switch may be presented by default, upon request or instruction of a user, or the like. In some exemplary embodiments, the visual indication of the switch may be placed near a border of sections, within a border between sections, or the like. In some cases, in order to have sufficient space for presenting the visual indication, the diagram may be widened, visually, at the border.

Figure 6:
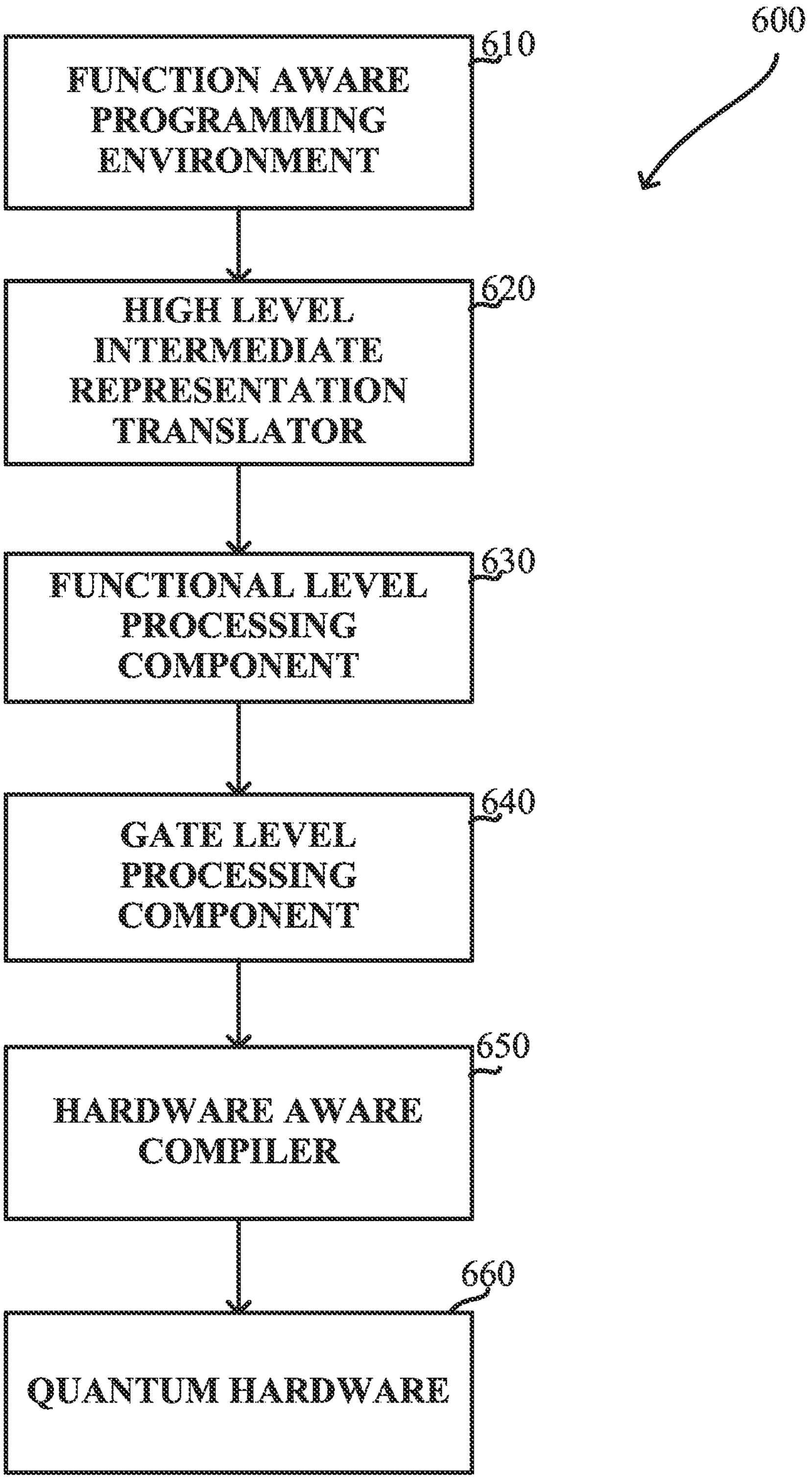
FIG. 6 shows an exemplary environment, in accordance with some exemplary embodiments of the disclosed subject matter.

Referring now to FIG. 6, showing an exemplary environment, in accordance with some exemplary embodiments of the disclosed subject matter.

In some exemplary embodiments, Environment 600 may correspond to the environment disclosed in U.S. application Ser. No. 17/450,583, titled "FUNCTIONAL-LEVEL PROCESSING COMPONENT FOR QUANTUM COMPUTERS", filed Oct. 12, 2021, which is hereby incorporated by reference in its entirety for all purposes without giving rise to disavowment.

In some exemplary embodiments, Environment 600 may comprise a Functional Aware Programming Environment 610. In some exemplary embodiments, Functional Aware Programming Environment 610 may comprise a programming environment that supports one or more high level programming languages for programming a quantum program, in an abstract form that does not necessarily refer to a qubit set, a gate set, or the like. Functional Aware Programming Environment 610 may utilize libraries with functions, variable types, or the like, e.g., QCL™ libraries.

In some exemplary embodiments, using Functional Aware Programming Environment 610, a programmer may program a high-level quantum program. In some exemplary embodiments, the quantum program may specify high level functions, low level components such as gates, a combination thereof, or the like. The high-level quantum program may comprise one or more function blocks. In some exemplary embodiments, a functional block may be a logical abstraction of a sub-circuit having a predetermined functionality. In some exemplary embodiments, the functional block may represent a sub-circuit that is executed over two or more cycles, using two or more qubits, using two or more quantum gates, or the like.

In some exemplary embodiments, Environment 600 may comprise a High Level Intermediate Representation (IR) Translator 620. In some exemplary embodiments, a quantum program created at Functional Aware Programming Environment 610 may be provided to High Level IR Translator 620, for translating the quantum program to a high level IR representation, including a language-independent intermediate representation of the code. In some exemplary embodiments, High Level IR Translator 620 may translate the quantum program from a specific programming language to a high level intermediate representation.

In some exemplary embodiments, Environment 600 may or may not comprise a Functional Level Processing Component 630. In some exemplary embodiments, Functional Level Processing Component 630 may obtain the IR functional-level representation of the quantum program from High Level IR Translator 620. In some exemplary embodiments, Functional Level Processing Component 630 may be configured to determine a gate-level implementation for the high level program, e.g., based on optimizations that are determined using a functional understating of the written functions, hardware constraints, user constraints, or the like.

In some exemplary embodiments, Environment 600 may comprise a Gate Level Processing Component 640. For example, Gate Level Processing Component 640 may be referred to as the logical compiler. In some exemplary embodiments, Gate Level Processing Component 640 may obtain from Functional Level Processing Component 630 a gate-level representation of the quantum program. In some exemplary embodiments, Gate Level Processing Component 640 may create a logical program by scheduling each gate or functional block within the logical program, allocating qubits and cycles for each gate, connecting qubits from some functional blocks to other functional blocks, or the like.

In some exemplary embodiments, Environment 600 may comprise a Hardware Aware Compiler 650 and a Quantum Hardware 660. In some exemplary embodiments, Hardware Aware Compiler 650, also referred to as hardware compiler or physical compiler, may obtain the logical program from Gate Level Processing Component 640, or a low level IR thereof, and compile the program into a machine representation. In some exemplary embodiments, Hardware Aware Compiler 650 may implement the program using available hardware gates, qubits, or the like, based on hardware constraints of Quantum Hardware 660. In some exemplary embodiments, Hardware Aware Compiler 650 may allocate hardware qubits to abstract logical qubits, hardware gates to logical gates, or the like. In some exemplary embodiments, the resulting quantum circuit may be executed on the Quantum Hardware 660 or in a simulator thereof.

In some exemplary embodiments, a first order of qubits may be determined by Gate Level Processing Component 640 for the logical program, by Functional Level Processing Component 630 for the gate-level representation of the circuit, or the like. In some exemplary embodiments, a graphical representation of the circuit may be generated to utilize one or more alternative second orders of qubits, e.g., for a layer representing a gate-level representation, a layer representing a functional representation of the circuit such as the high-level quantum program, sections thereof, or the like. In some exemplary embodiments, the one or more alternative second orders of qubits may be determined by Functional Level Processing Component 630, Gate Level Processing Component 640, a separate processing unit, or the like.

Figure 7:
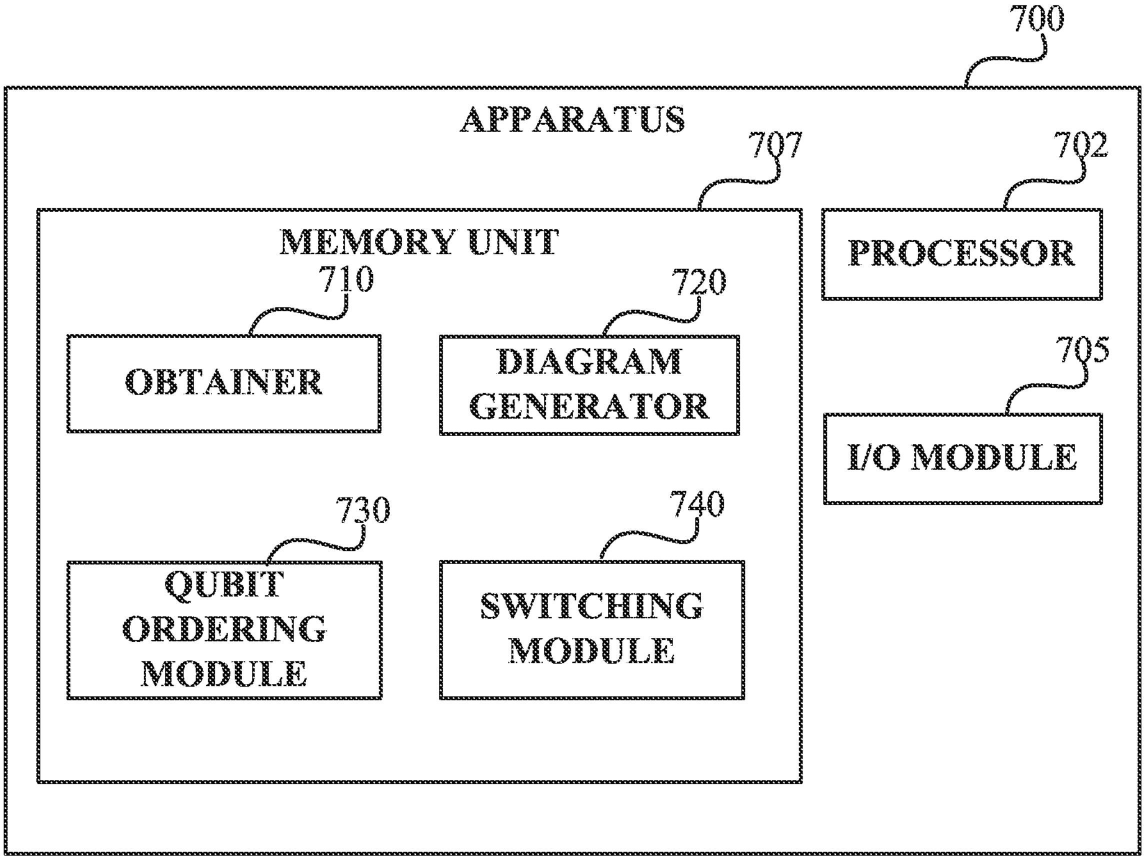
FIG. 7 shows an exemplary block diagram of an apparatus, in accordance with some exemplary embodiments of the disclosed subject matter.

Referring now to FIG. 7 showing a block diagram of an apparatus, in accordance with some exemplary embodiments of the disclosed subject matter.

In some exemplary embodiments, Apparatus 700 may comprise one or more Processor(s) 702. Processor 702 may be a Central Processing Unit (CPU), a microprocessor, an electronic circuit, an Integrated Circuit (IC) or the like. Processor 702 may be utilized to perform computations required by Apparatus 700 or any of its subcomponents. It is noted that Processor 702 may be a traditional processor, and not necessarily a quantum processor.

In some exemplary embodiments of the disclosed subject matter, Apparatus 700 may comprise an Input/Output (I/O) module 705. I/O Module 705 may be utilized to provide an output to and receive input from a user, an apparatus, or the like, such as, for example to obtain a user-defined quantum program, showing circuit illustrations, communicating with quantum hardware, or the like.

In some exemplary embodiments, Apparatus 700 may comprise Memory 707. Memory 707 may be a hard disk drive, a Flash disk, a Random Access Memory (RAM), a memory chip, or the like. In some exemplary embodiments, Memory 707 may retain program code operative to cause Processor 702 to perform acts associated with any of the subcomponents of Apparatus 700. Memory 707 may comprise one or more components as detailed below, implemented as executables, libraries, static libraries, functions, or any other executable components.

In some exemplary embodiments, Memory 707 may comprise an Obtainer 710. Obtainer 710 may be configured to obtain one or more representations of a quantum circuit having respective first orders of qubits. For example, Obtainer 710 may obtain from a logical compiler (not illustrated), a logical representation of a quantum circuit that utilizes a first order of qubits.

In some exemplary embodiments, Memory 707 may comprise a Diagram Generator 720. In some exemplary embodiments, Diagram Generator 720 may be configured to obtain a representations of a quantum circuit from an Obtainer 710, and generate a graphical representation thereof, based on input from Qubit Ordering Module 730 and Switching Module 740. In some cases, Diagram Generator 720 may be configured to provide to Qubit Ordering Module 730 and Switching Module 740 a representation of a quantum circuit and an order of qubits that is to be tested. In some cases, Diagram Generator 720 may be configured to generate multiple diagrams according to the representation of the quantum circuit and various order of qubits, and provide the generated diagram to Qubit Ordering Module 730 and Switching Module 740 for a testing.

In some exemplary embodiments, Memory 707 may comprise a Switching Module 740. In some exemplary embodiments, Switching Module 740 may be configured to obtain from Diagram Generator 720 a diagram, or generate a diagram based on input from Diagram Generator 720. In some exemplary embodiments, Switching Module 740 may separate a layer of the diagram to one or more sections, for which orders of qubits may be determined by Qubit Ordering Module 730. For example, Switching Module 740 may identify circuit components that manipulate non-adjacent qubits, qubits with a distance that overpasses a threshold, or the like, and allocate separate sections for such components in case proper borders are detected for the sections.

In some exemplary embodiments, Memory 707 may comprise a Qubit Ordering Module 730. In some exemplary embodiments, Qubit Ordering Module 730 may be configured to determine one or more alternative second order of qubits for respective layers, sections of layers, or the like, e.g., using a global optimization, a local optimization, or the like. For example, Qubit Ordering Module 730 may obtain indications of layer sections from Switching Module 740, and determine second orders of qubits for such sections using local optimization processes. As another example, Qubit Ordering Module 730 may obtain from Diagram Generator 720 a representation of a quantum circuit, and determine a second order of qubits for each layer of the representation, such as by using a global optimization.

In some exemplary embodiments, Diagram Generator 720 may obtain from Qubit Ordering Module 730 determined orders of qubits for layers, sections, or the like, and determine whether or not each order of qubits should be applied on the respective section or layer, e.g., based on whether or not applying the order significantly improves the quality measurement of the diagram. For example, Diagram Generator 720 may first apply to each layer of the diagram a global order of qubits that is determined based on a global optimization process, and subsequently may determine for each section whether or not a local order for the section that is obtained by Qubit Ordering Module 730, significantly improves the quality measurement of the section compared to retaining the global order of qubits, a previous local order, or the like. In some exemplary embodiments, after determining which orders of qubits should be applied to generate the graphical representation of the circuit, Diagram Generator 720 may apply the selected orders of qubits to respective layers, sections, or the like. In some exemplary embodiments, Diagram Generator 720 may generate a respective graphical representation, and present the graphical representation to a user.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), electrical signals transmitted through a wire, Quantum Random Access Memory (QRAM), photons, trapped ions, lasers, cold atoms, or the like.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server (or a group of multiple remote servers). In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

What is claimed is:

1. A method comprising:

obtaining a representation of a quantum circuit, the quantum circuit is configured to manipulate a plurality of qubits over a plurality of cycles, the representation defining a first order of the plurality of qubits;

determining a second order of the plurality of qubits that is different from the first order of the plurality of qubits, wherein said determining the second order is based on an objective function, the objective function is configured to provide scores based on respective lengths of circuit components in graphical representations of the quantum circuit or portions thereof, wherein the objective function is configured to yield different scores for different orders of the plurality of qubits;

generating a graphical representation of the quantum circuit or portion thereof, the graphical representation displaying the plurality of qubits in accordance with the second order of the plurality of qubits, wherein the graphical representation comprises two disjoint sections, wherein the objective function comprises a local objective function, wherein the local objective function is applied to at least one of the two disjoint sections, wherein the two disjoint sections comprise first and second sections;

implementing a switching scheme between the first and second sections, wherein the switching scheme comprises:

utilizing the second order of the plurality of qubits for the first section, the second order is determined based on the local objective function and with respect to the first section; and utilizing a third order of the plurality of qubits for the second section, the third order is determined based on the local objective function and with respect to the second section, wherein said utilizing the third order is based on a determination that a difference between a quality measurement of the second section when utilizing the third order, and between a quality measurement of the second section when utilizing the second order, is greater than a threshold, wherein a quality measurement of a section is determined based on the lengths of the circuit components within the section; and displaying the graphical representation of the quantum circuit or portion thereof.

2. The method of claim 1, wherein said determining the second order comprises solving an optimization problem with respect to the objective function.

3. The method of claim 1, wherein the graphical representation comprises a gate-level layer of the quantum circuit, wherein the circuit components comprise quantum gates, wherein the lengths of the quantum gates comprise, for each quantum gate, a distance between two farthest qubits that are manipulated by the quantum gate.

4. The method of claim 1, wherein the graphical representation comprises a functional-level layer of the quantum circuit, wherein the circuit components comprise functional blocks, wherein the lengths of the functional blocks comprise, for each functional block, a distance between two farthest qubits that are manipulated by the functional block.

5. The method of claim 1, wherein the switching scheme comprises:

utilizing the second order of the plurality of qubits for the first section, wherein the second order of the plurality of qubits is determined based on a global objective function that is applied with respect to all cycles of the graphical representation; and utilizing a third order of the plurality of qubits for the second section, wherein the third order is obtained based on the local objective function and with respect to the second section.

6. The method of claim 1, wherein the objective function comprises a global objective function, wherein the global objective function is applied to a layer of the graphical representation in its entirety.

7. The method of claim 1, wherein the first order of the plurality of qubits is obtained from a logical compiler that outputted, as part of a compilation process, the representation of the quantum circuit.

8. The method of claim 1, wherein the first order is implicitly defined by a naming of the plurality of qubits provided in the representation of the quantum circuit.

9. The method of claim 1, wherein said displaying the graphical representation of the quantum circuit comprises displaying a functional-level layer in accordance with the second order;

wherein said method further comprises: in response to a user selection of a functional element displayed in the functional-level layer, displaying a gate-level layer of the functional element, wherein the gate-level layer of the functional element is displayed using a third order of the plurality of qubits or portion thereof, the third order is inconsistent with the second order.

10. An apparatus comprising a processor and coupled memory, said processor being adapted to:

obtain a representation of a quantum circuit, the quantum circuit is configured to manipulate a plurality of qubits over a plurality of cycles, the representation defining a first order of the plurality of qubits;

determine a second order of the plurality of qubits that is different from the first order of the plurality of qubits, wherein said determine the second order is based on an objective function, the objective function is configured to provide scores based on respective lengths of circuit components in graphical representations of the quantum circuit or portions thereof, wherein the objective function is configured to yield different scores for different orders of the plurality of qubits;

generate a graphical representation of the quantum circuit or portion thereof, the graphical representation displaying the plurality of qubits in accordance with the second order of the plurality of qubits, wherein the graphical representation comprises two disjoint sections, wherein the objective function comprises a local objective function, wherein the local objective function is applied to at least one of the two disjoint sections, wherein the two disjoint sections comprise first and second sections;

implement a switching scheme between the first and second sections, wherein the switching scheme comprises:

utilizing the second order of the plurality of qubits for the first section, the second order is determined based on the local objective function and with respect to the first section; and utilizing a third order of the plurality of qubits for the second section, the third order is determined based on the local objective function and with respect to the second section, wherein said utilizing the third order is based on a determination that a difference between a quality measurement of the second section when utilizing the third order, and between a quality measurement of the second section when utilizing the second order, is greater than a threshold, wherein a quality measurement of a section is determined based on the lengths of the circuit components within the section; and display the graphical representation of the quantum circuit or portion thereof.

11. The apparatus of claim 10, wherein said determine the second order comprises solving an optimization problem with respect to the objective function.

12. The apparatus of claim 10, wherein the graphical representation comprises a gate-level layer of the quantum circuit, wherein the circuit components comprise quantum gates, wherein the lengths of the quantum gates comprise, for each quantum gate, a distance between two farthest qubits that are manipulated by the quantum gate.

13. The apparatus of claim 10, wherein the graphical representation comprises a functional-level layer of the quantum circuit, wherein the circuit components comprise functional blocks, wherein the lengths of the functional blocks comprise, for each functional block, a distance between two farthest qubits that are manipulated by the functional block.

14. The apparatus of claim 10, wherein said display the graphical representation of the quantum circuit comprises displaying a functional-level layer in accordance with the second order;

wherein said processor is further adapted to: in response to a user selection of a functional element displayed in the functional-level layer, display a gate-level layer of the functional element, wherein the gate-level layer of the functional element is displayed using a third order of the plurality of qubits or portion thereof, the third order is inconsistent with the second order.

15. An apparatus comprising a processor, a coupled memory and a display device, said processor being configured to:

receive a description of a quantum circuit, the quantum circuit configured to process a set of qubits across a series of cycles, the description specifying an initial ordering of the set of qubits;

compute an alternative ordering of the set of qubits that differs from the initial ordering, wherein said computing the alternative ordering is based on a scoring function, the scoring function configured to calculate values based on distances of circuit elements in visual depictions of the quantum circuit or segments thereof, wherein the scoring function is configured to produce distinct values for distinct orderings of the set of qubits;

produce a visual depiction of the quantum circuit or segment thereof, the visual depiction rendering the set of qubits according to the alternative ordering, wherein the visual depiction comprises a first segment and a second segment that are non-overlapping, wherein the scoring function comprises a segment-specific scoring function, wherein the segment-specific scoring function is applied to at least one of the first segment and the second segment;

execute a reordering scheme between the first segment and the second segment, wherein the reordering scheme comprises:

applying the alternative ordering of the set of qubits for the first segment, the alternative ordering computed based on the segment-specific scoring function with respect to the first segment; and applying a further ordering of the set of qubits for the second segment, the further ordering computed based on the segment-specific scoring function with respect to the second segment, wherein said applying the further ordering is based on a determination that a disparity between a clarity metric of the second segment when applying the further ordering and a clarity metric of the second segment when applying the alternative ordering exceeds a predefined limit, wherein a clarity metric of a segment is computed based on the distances of the circuit elements within the segment; and display the visual depiction of the quantum circuit or segment thereof on said display device.

16. The apparatus of claim 15, wherein said computing the alternative ordering comprises solving an optimization problem with respect to the scoring function.

17. The apparatus of claim 15, wherein the visual depiction comprises a gate-level representation of the quantum circuit, wherein the circuit elements comprise quantum gates, wherein the distances of the quantum gates comprise, for each quantum gate, a separation between two most distant qubits that are processed by the quantum gate.

18. The apparatus of claim 15, wherein the visual depiction comprises a functional-level representation of the quantum circuit, wherein the circuit elements comprise functional blocks, wherein the distances of the functional blocks comprise, for each functional block, a separation between two most distant qubits that are processed by the functional block.

19. The apparatus of claim 15, wherein the first segment and the second segment are established such that no circuit element has a first portion in the first segment and a second portion in the second segment unless a relative arrangement of qubits utilized by the circuit element is unaffected by the reordering scheme.

* * * * *